United States Patent
Cromer et al.

(12)

(10) Patent No.: US 6,263,388 B1
(45) Date of Patent: Jul. 17, 2001

(54) DATA PROCESSING SYSTEM AND METHOD FOR REMOTELY DISABLING NETWORK ACTIVITY IN A CLIENT COMPUTER SYSTEM

(75) Inventors: Daryl Carvis Cromer, Cary; Brandon Jon Ellison, Raleigh; Eric Richard Kern, Durham; Randall Scott Springfield, Chapel Hill, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/201,063

(22) Filed: Nov. 30, 1998

(51) Int. Cl.⁷ .................................................... G06F 17/30
(52) U.S. Cl. ........................ 710/107; 707/9; 340/825.31
(58) Field of Search ................................ 713/201; 707/8, 707/9; 340/825.34, 825.31; 380/30; 710/107

(56) References Cited

U.S. PATENT DOCUMENTS

| | | | |
|---|---|---|---|
| 4,930,159 | * | 5/1990 | Kravitz et al. ...................... 713/155 |
| 5,124,984 | * | 6/1992 | Engel ................................... 370/230 |
| 5,471,459 | * | 11/1995 | Gut ................................... 340/825.34 |
| 5,530,854 | * | 6/1996 | Emery et al. ............................. 707/2 |
| 5,805,801 | * | 9/1998 | Holloway et al. .................... 713/201 |
| 5,905,859 | * | 5/1999 | Holloway et al. .................... 713/201 |

OTHER PUBLICATIONS

PCT International Search Report, Mailing Date: Jun. 20, 2000.

* cited by examiner

*Primary Examiner*—Paul R. Lintz
(74) *Attorney, Agent, or Firm*—J Bruce Schelkopf; Bracewell & Patterson, LL (57) ABSTRACT

A data processing system and method are described for permitting a server computer system to remotely disable an ability of a client computer system to access a network which couples the client computer system to the server computer system. The server computer system transmits an indication to the client computer system utilizing the network that the ability of the client computer system to access said network be at least temporarily disabled. In response to a receipt of the indication by the client computer system, the ability of the client computer system to access the network is at least temporarily disabled. The client computer system is unable to transmit information utilizing the network while the client computer system is temporarily disabled.

7 Claims, 6 Drawing Sheets

DATA PROCESSING SYSTEM AND METHOD FOR REMOTELY DISABLING NETWORK ACTIVITY IN A CLIENT COMPUTER SYSTEM

CROSS-REFERENCE TO RELATED APPLICATIONS

The present invention is related to the subject matter of co-pending patent application Ser. No. 09/024,231 entitled "FULL TIME NETWORK AUXILIARY PROCESSOR FOR A NETWORK CONNECTED PC" filed on Feb. 17, 1998 assigned to the assignee herein named and incorporated herein by reference.

BACKGROUND OF THE INVENTION

1. Field of the Invention

The present invention relates in general to data processing systems and, in particular, to a data processing system and method including a server and client computer system coupled together utilizing a network. Still more particularly, the present invention relates to a data processing system and method including a server and client computer system coupled together utilizing a network for remotely disabling an ability of the client to access the network.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC series, Aptiva series, and Thinkpad series.

With PCs being increasingly connected into networks to allow transfers of data among computers to occur, more operations such as maintenance, updating of applications, and data collections are occurring over the network. Computer networks are also becoming essential to their user. It is desirable minimize loss of productivity by increasing availability of network resources. In today's network world, the availability and performance of the network is as important as the availability and performance of the personal computer.

With the evolution from mainframe and dumb terminal to client-server networks, computing has created several issues for Information Services (IS) managers. In the mainframe/dumb terminal world, the communication path was from the terminal to the mainframe and then to other systems. In the client-server world, the client has the ability to send messages to and from other clients, as well as to the server.

One disadvantage of the client-server environment occurs when a client malfunctions. A malfunctioning client can disrupt the entire network by generating excessive network traffic. A hacker, software bus, or other system problem may cause the malfunction.

In the mainframe/dumb terminal environment, the IS manager could log-off the account and shut down the terminal, thus eliminating the excessive network traffic. In the client/server environment, the IS manager may send a request to the operating system of the client to stop sending messages. However, the operating system may or may not respond.

Therefore a need exists for a data processing system and method for a server computer system to remotely disable an ability of a client to access the network.

SUMMARY OF THE INVENTION

A data processing system and method are described for permitting a server computer system to remotely disable an ability of a client computer system to access a network which couples the client computer system to the server computer system. The server computer system transmits an indication to the client computer system utilizing the network that the ability of the client computer system to access said network be at least temporarily disabled. In response to a receipt of the indication by the client computer system, the ability of the client computer system to access the network is at least temporarily disabled. The client computer system is unable to transmit information utilizing the network while the client computer system is temporarily disabled.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–6 of the drawings, like numerals being used for like and corresponding parts of the accompanying drawings.

The present invention is a method and system for permitting a server computer system coupled to a client computer system utilizing a network to remotely disable or re-enable an ability of the client computer system to access the network.

The ability of the client to access the network may be disabled using one of two methods described below. However, those skilled in the art will recognize that other methods for implementing the claims may be utilized. The first method described permits a server to remotely disable the client's network access ability temporarily. The second method permits a server to remotely disable the ability permanently.

The client computer system includes a media access controller, which is an Ethernet controller in a preferred embodiment. The media access controller (MAC) couples the client computer system to the network. The client computer system utilizes the MAC to send and receive network packets. When the server transmits an indication to the client to temporarily disable the ability of the client to access the network, a management application specific integrated circuit (ASIC) included within the client receives the packet from the MAC which received the packet from the network. In response to a receipt of this packet, the ASIC isolates the MAC from the PCI bus of the client. Since the operating system communicates with the MAC utilizing the PCI bus, the operating system of the client cannot send or receive network packets.

However, while the MAC is isolated from the PCI bus, the MAC will continue to receive network packets from the network. The MAC will continue to forward management network packets received from the network to the ASIC. The MAC will ignore data network packets. Therefore, the server may subsequently transmit an indication to the client to reenable the ability of the client to access the network. When this indication is received, the ASIC will transmit a signal to the MAC which will re-enable the coupling of the MAC to the PCI bus. The client may then again access the network by sending or receiving network packets.

It may become necessary to hold the client in a physical reset mode in order to permanently remove the client from the network. This is accomplished by the server transmitting an indication to the client to permanently disable the ability of the client to access the network. In response to a receipt of a network packet including such an indication, the ASIC will generate a physical reset signal which it transmits to the physical layer. In response to a receipt of this signal by the physical layer, the client's ability to access the network is permanently disabled. In this manner, the MAC will not receive and may not transmit any network packets. After the client has been permanently disabled from accessing the network, a user must re-enable the physical layer by resetting the client computer system and entering the appropriate password in order to restore the client's ability to access the network.

The present invention permits a server to modify the operation of a client's network hardware in order to disable/re-enable the client's ability to access the network. The client's operating system and other software are prohibited from gaining any access to the network while the ability to access the network is disabled.

Figure 1:
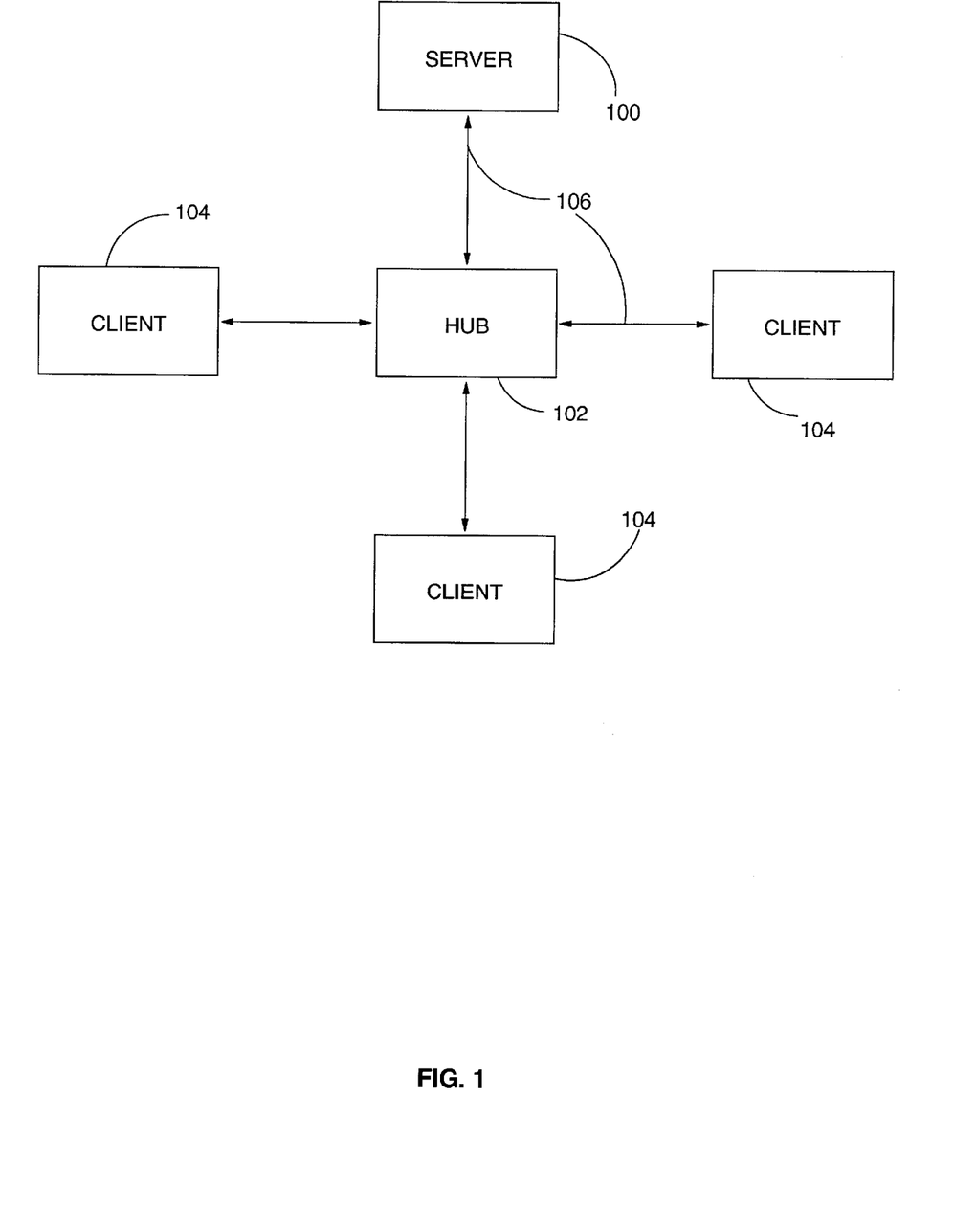
FIG. 1 illustrates a pictorial representation of a data processing system including a plurality of client computer systems coupled to a server computer system utilizing a network and a hub in accordance with the method and system of the present invention.

FIG. 1 illustrates a pictorial representation of a data processing system including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks, such as token ring, may be utilized to implement the invention.

Figure 2:
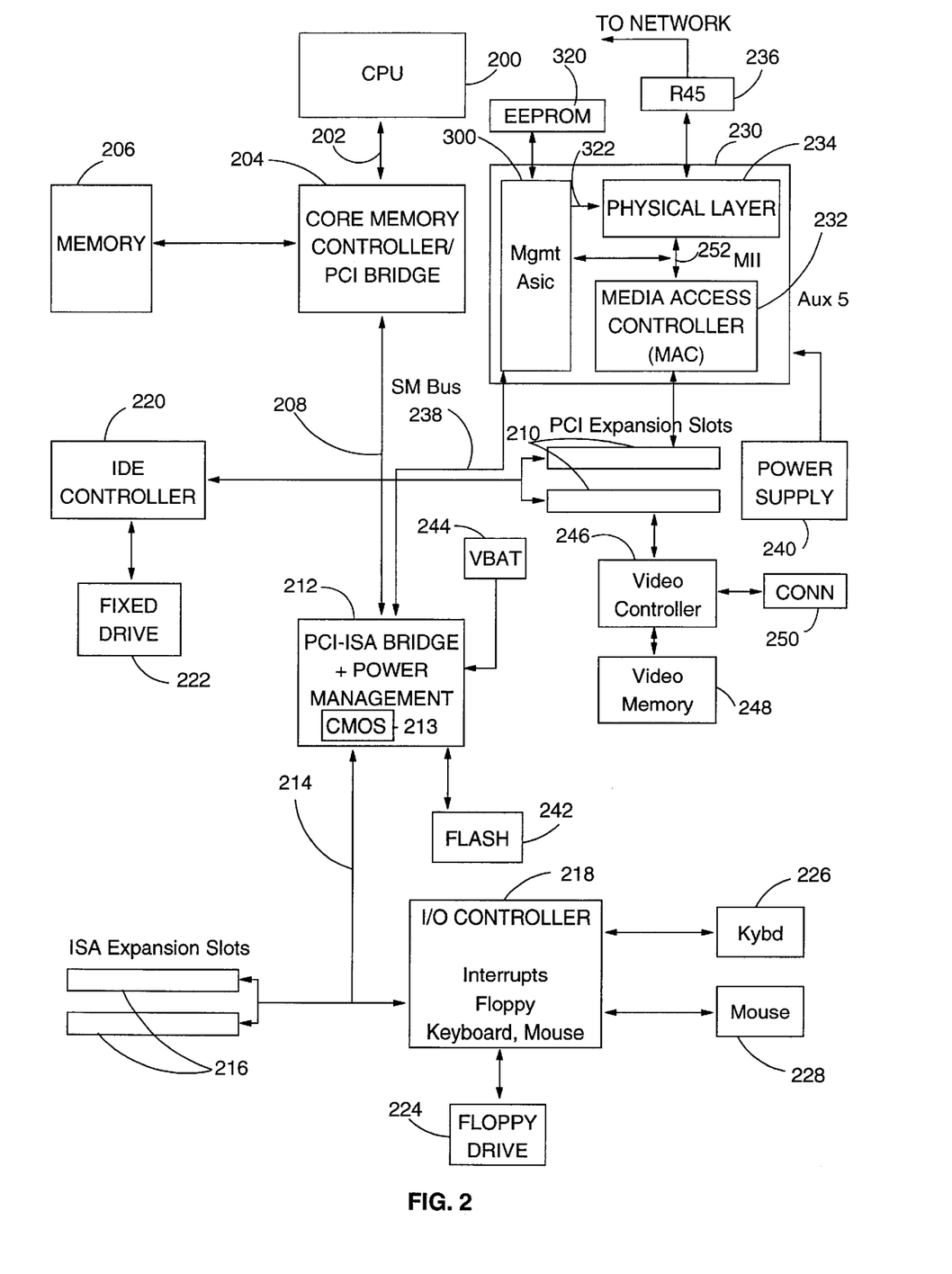
FIG. 2 depicts a pictorial representation of a network adapter included within a client computer system in accordance with the method and system of the present invention.

FIG. 2 illustrates a pictorial representation of a network adapter 230 included within a client computer system in accordance with the method and system of the present invention. A central processing unit (CPU) 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes microcode which client 104 executes upon power-on. Flash memory 242 is an electrically erasable programmable read only memory (EEPROM) module and includes BIOS that is used to interface between the I/O devices and operating system. PCI-ISA bridge controller 214 also includes CMOS storage 213 that holds initialization settings which represents system configuration data. Storage 213 includes values which describe the present configuration of client 104. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 204 is supplied power from battery 244 to prevent loss of configuration data in storage 213.

Client system 104 includes a video controller 246 which may, for example, be plugged into one of connector slots 210. Video controller 246 is connected to video memory 248.

The image in video memory 248 is read by controller 246 and displayed on a monitor (not shown) which is connected to client 104 through connector 250.

A client system 104 includes a network adapter 230 which may, for example, be plugged into one of the PCI connector slots 210 (as illustrated) or one of the ISA connector slots 216 in order to permit client 104 to communicate with a LAN via connector 236 to hub 102.

Client computer system 104 includes a special power supply 240 which supplies full normal system power, and has an auxiliary power main AUX 5 which supplies full time power to the power management logic 212 and to the network adapter 230. This enables client 104 to respond to a wakeup signal from network adapter 230. In response to a receipt of the wakeup signal, power supply 240 is turned on and then powers up client 104.

Network adapter 230 includes a physical layer 234 and a media access controller (MAC) 232 connected together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

MAC 232 processes digital network signals, and serves as an interface between a shared data path, i.e. the MII bus 252, and the PCI bus 208. MAC 232 performs a number of functions in the transmission and reception of data packets.

For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mb/s CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network.

In a preferred embodiment, physical layer 234 is implemented utilizing an Integrated Services chip ICS-1890.

Physical layer 234 includes auto-negotiation logic that serves three primary purposes. First, it determines the capabilities of client computer 104. Second, it advertises its own capabilities to server computer 100. Third, it establishes a connection with server computer 100 using the highest performance connection technology.

Network adapter 230 includes a logic module 300 coupled to the MII bus 252 between physical layer 234 and MAC 232. Logic module 300 may be a "hard wired" application specific integrated circuit (ASIC) or a programmed general-purpose processor which is programmed as more fully described below. By coupling ASIC 300 to the MII bus 252, ASIC 300 may send and receive network packets using physical layer 234.

Data from client computer system 104 is accessed by ASIC 300 over a system management bus (SM) 238. System management bus 238 is a two-wire low speed serial bus used to interconnect management and monitoring devices. With the trickle power supplied by signal AUX 5 from power supply 240, ASIC 300 is preferably powered full time. Micro-controller 302 (shown in FIG. 3) included within ASIC 300 is coupled to bridge controller 212 via the System Management (SM) bus 238 through SM bus interface 316. This provides a path to allow software running on client 104 to access ASIC and EEPROM 320.

Figure 3:
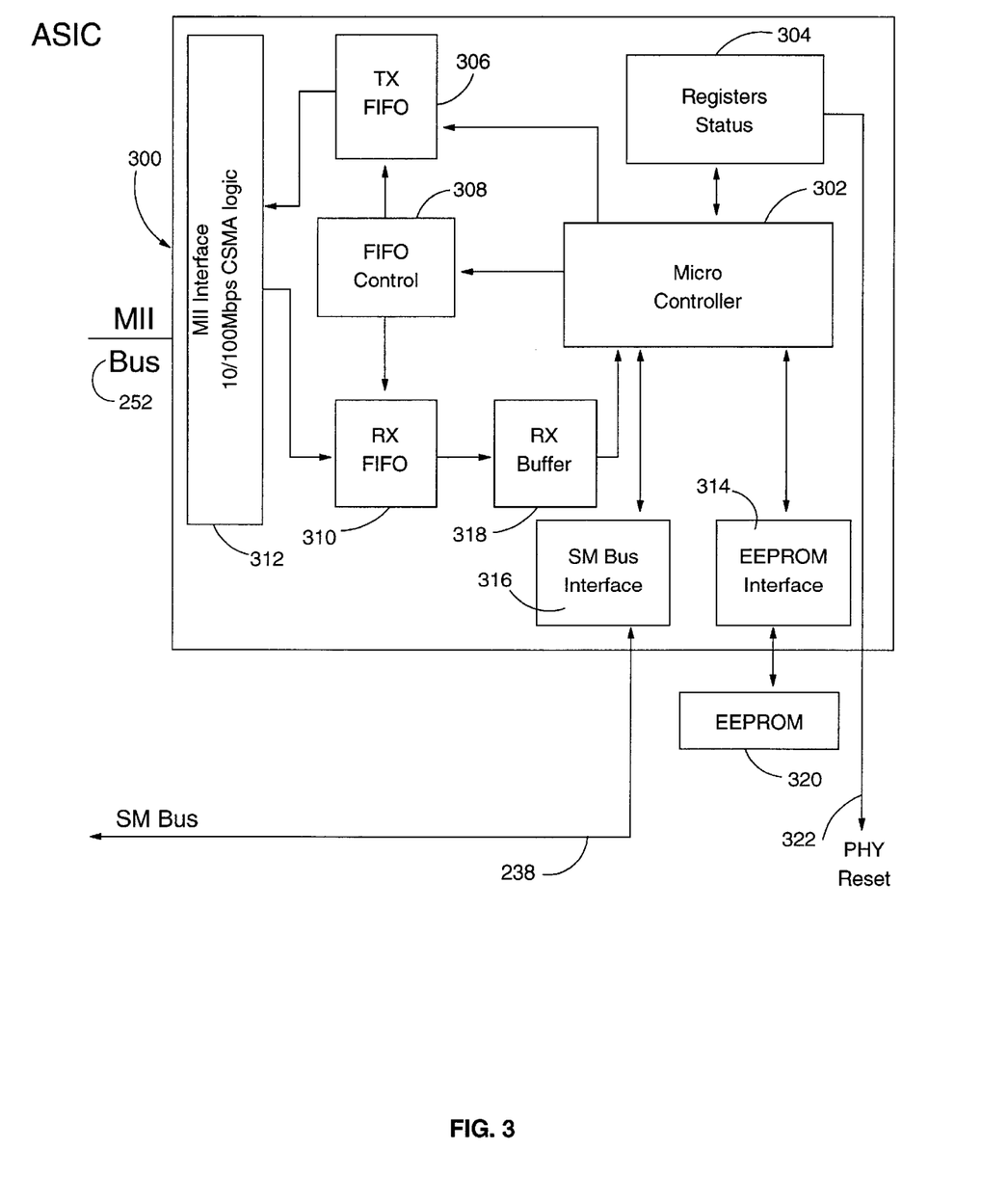
FIG. 3 illustrates a pictorial representation of a special purpose processing unit which is included within a network adapter included within a client computer system in accordance with the method and system of the present invention.

FIG. 3 illustrates a pictorial representation of a special purpose processing unit 300 which is included within a network adapter 230 included within a client computer system 104 in accordance with the method and system of the present invention. The special purpose processing unit is preferably implemented utilizing ASIC 300 which includes a micro-controller 302 which includes several state machines to handle the following tasks: packet reception, SM bus interface, and EEPROM updates. Micro-controller 302 sends commands to FIFO control 308 to control data flow from TX FIFO 306, RX FIFO 310, and RX Buffer 318. Micro-controller 302 also responds to SM bus requests from software running on client 104 to access register status 304 or access EEPROM 320. Signals are received from the MII bus 252 by interface unit 312 and passed to RX FIFO 310.

Micro-controller 302 accesses EEPROM 320 through EEPROM interface 314 to obtain values to create network packets such as source and destination MAC addresses, IP protocol information, authentication headers, and Universal Data Packet headers. Further, EEPROM 320 retains the Universal Unique Identifier (UUID).

Micro-controler 302 drives PHY reset 322 line to physical layer 234 through registers/status 304. Micro-controller 302, therefore, has the ability to place the physical layer 234 in a reset state, based on management packets, which will result in the physical layer dropping the connection to the network.

Figure 4:
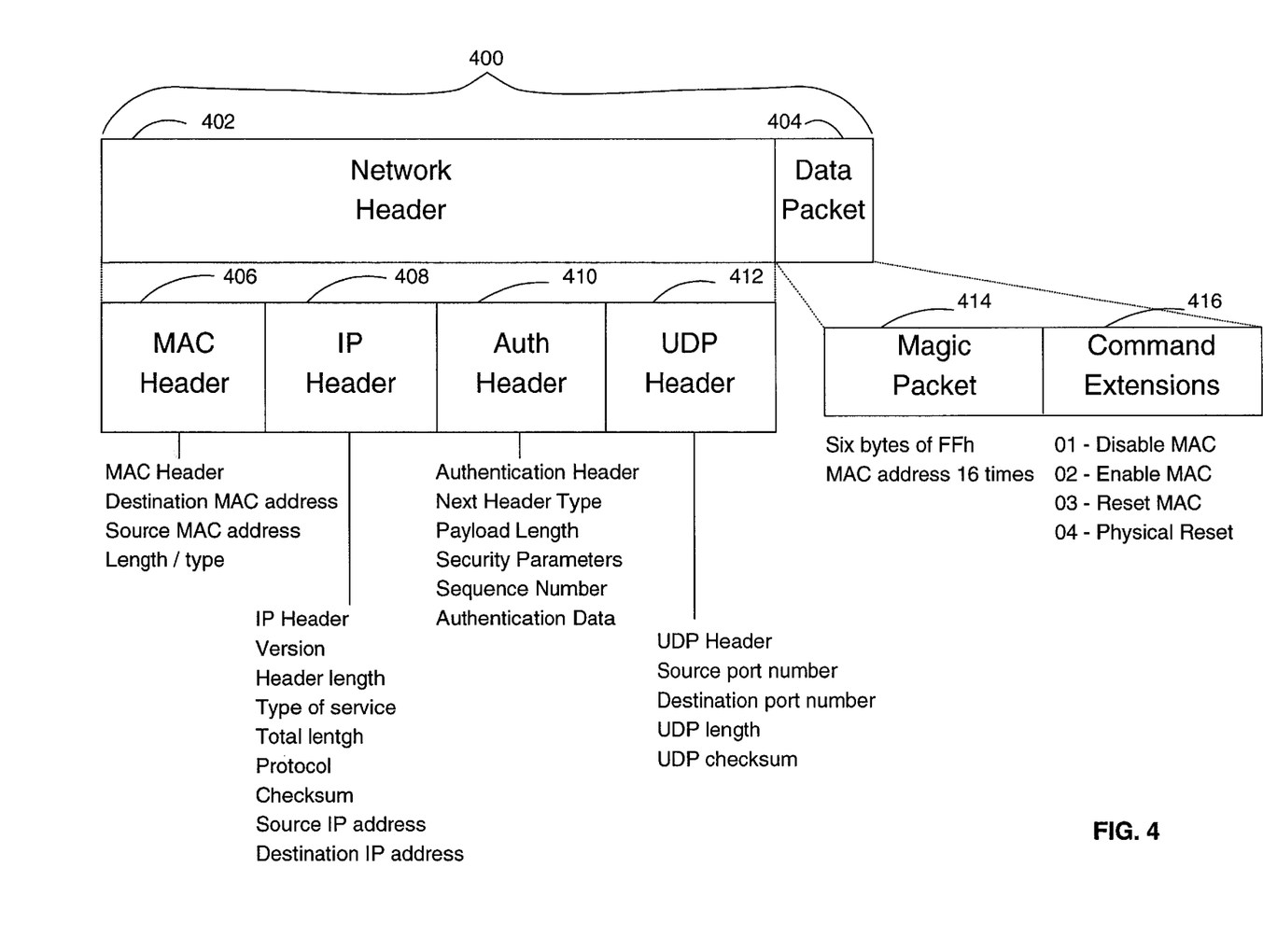
FIG. 4 illustrates a pictorial representation of a network packet, including a network header and a data packet, which may be transmitted by a server computer system over the network in accordance with the method and system of the present invention.

FIG. 4 illustrates a pictorial representation of a network packet 400, including a network header 402 and a data packet 404, which may be transmitted by a server computer system over the network in accordance with the method and system of the present invention. Each network packet 400 includes a network header 402 and a data packet 404.

Network header 402 includes a MAC header 406, IP header 408, authentication header 410, and UDP header 412 which are all known in the art to provide addresses, identifiers, and other information for assuring correct transfer of the packet. Data packet 404 includes the information content to be transferred.

Data packet 404 includes a magic packet 414 and command extensions 416. The content of Magic packet 414 is six bytes of "FF" followed by 12 copies of client MAC addresses. Magic packet 414 is a specialized type of packet. Magic packet 414 is a management packet which does not include standard network data. When magic packet 414 is detected utilizing the six bytes of "FF", MAC 232 will ignore magic packet 414.

Data packet 404 also may include command extensions 416. Server computer system 100 may specify one of a plurality of command extensions in data packet 404 in order to cause ASIC 300 to modify the network activity of client 104.

When a network packet 400 is received by client 104, it is received by physical layer 234 and placed on the MII bus 252. When network packet 400 includes magic packet 414, MAC 232 detects that it includes magic packet 414, and then MAC 232 ignores any command extensions 416.

ASIC 300 also receives network packet 400 utilizing the MII interface 312. Data packet 404 is transferred to RX FIFO 310 and then to RX buffer 318. Micro-controller 302 then inspects data packet 404 and determines whether data packet 404 includes command extensions 416. If command extensions 416 are included, the appropriate function is executed in accordance with the description which follows.

Figure 5:
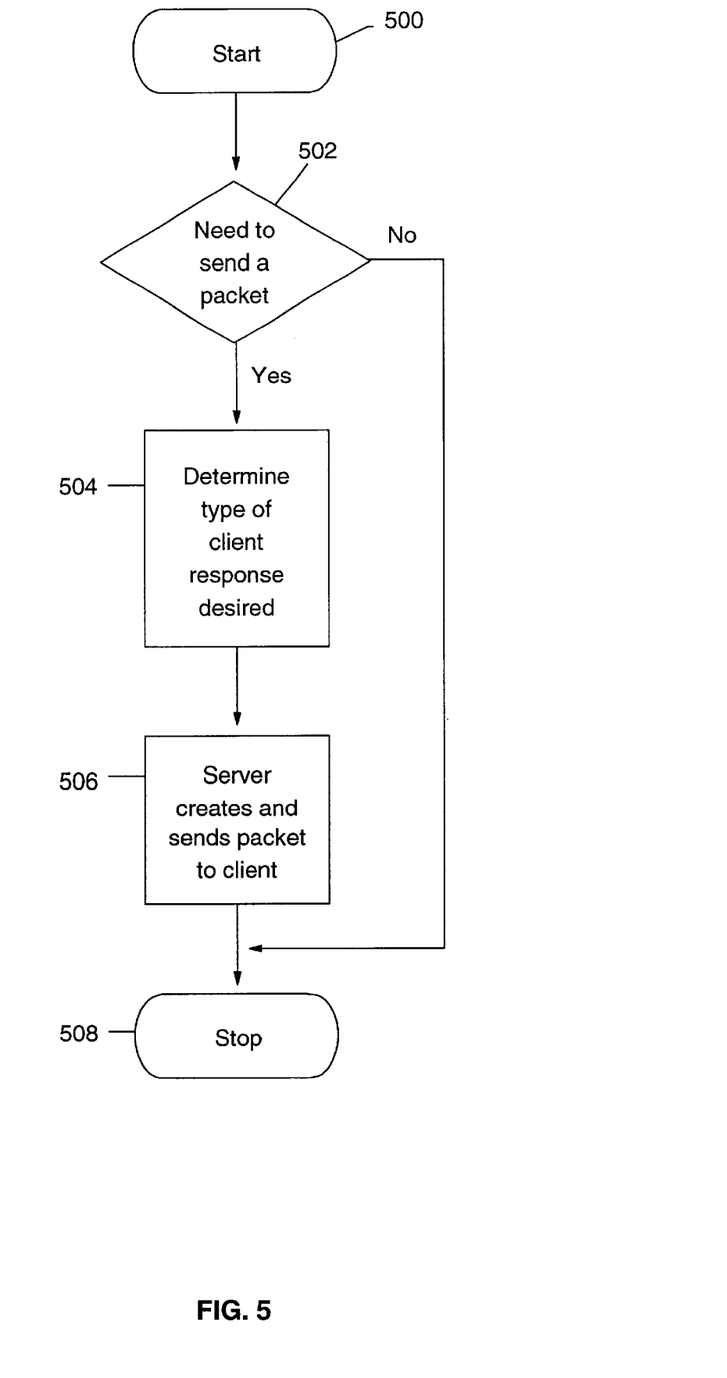
FIG. 5 depicts a high level flow chart which illustrates a server computer system transmitting an indication to a client computer system which disables/re-enables an ability of the client computer system to access a network in accordance with the method and system of the present invention.

FIG. 5 depicts a high level flow chart which illustrates a server computer system transmitting an indication to a client computer system which disables/reenables an ability of the client computer system to access a network in accordance with the method and system of the present invention. The process starts as depicted by block 500 and thereafter passes to block 502 which illustrates a determination of whether or not the server will transmit an indication to a client to remotely disable the client from accessing the network. If a determination is made that the server will not transmit such packet, the process terminates as depicted by block 508.

Referring again to block 502, if a determination is made that the server will transmit an indication to a client, the process passes to block 504 which illustrates a determination of a type of client response desired in response to a receipt of the packet. For example, the types of client responses may include disabling the client from accessing the network, re-enabling the client to access the network, initializing the network controller included within the client, or holding the physical layer of the client in a physical reset, thus permanently disabling the client from accessing the network. Next, block 506 depicts the server creating and transmitting the packet to the client computer system. The process then terminates as illustrated by block 508.

Figure 6:
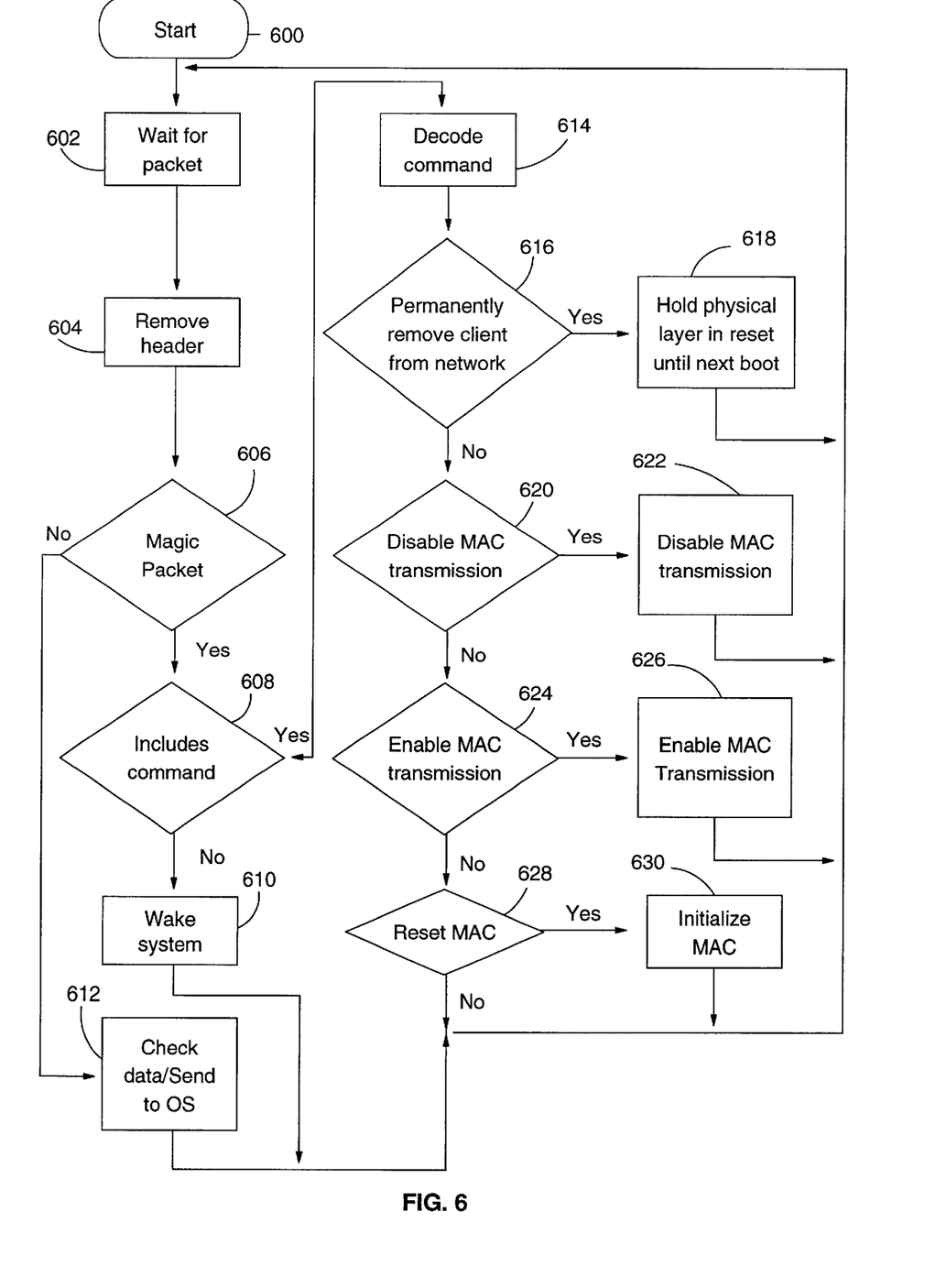
FIG. 6 illustrates a high level flow chart which depicts a client computer system receiving an indication from a server computer system to disable/re-enable the ability of the client computer system to access the network in accordance with the present invention.

FIG. 6 illustrates a high level flow chart which depicts a client computer system receiving an indication from a server computer system to disable/re-enable the ability of the client computer system to access the network in accordance with the present invention. The process starts as depicted by block 600 and thereafter passes to block 602 which illustrates a micro-controller 302 included within a client computer system waiting to receive network packet 400. When the packet has been received, physical layer 234 places data packet 404 included within network packet 400 on the MII bus 252. The MII bus 252 is read by MII interface 312 of ASIC 300. ASIC 300 transfers data packet 404 from MII interface 312 to RX FIFO 310 and to RX buffer 318.

The process then passes to block 604 which depicts micro-controller 302 removing network header 402 from the packet. Next, block 606 illustrates a determination by micro-controller 302 whether data packet 404 included magic packet 414. If a determination is made that data packet 404 did not include magic packet 414, the process passes to block 612 which depicts the data included within data packet 404 being sent to the operating system (OS). The process then passes back to block 602.

Referring again to block 606, if a determination is made that data packet 404 did include magic packet 414, the process passes to block 608 which illustrates a determination of whether or not data packet 404 also included additional commands 416. If a determination is made that data packet 404 does not include any additional commands 416, the process passes to block 610 which depicts the transmission of a wakeup command which will cause the client to power up. The process then passes back to block 602.

Referring again to block 608, if a determination is made that data packet 404 does include additional commands 416, the process passes to block 614 which depicts the decoding of the additional commands 416. Next, block 616 illustrates a determination of whether or not the command is an indication that the ability of the client computer system to access the network should be permanently disabled. If a determination is made that the command is an indication that the ability of the client computer system to access the network should be permanently disabled, the process passes to block 618 which depicts physical layer reset signal 322 being activated so that physical layer 234 is held in reset until the next boot of the system. The process then passes back to block 602.

Referring again to block 616, if a determination is made that the command is not an indication that the ability of the client computer system to access the network should be permanently disabled, the process passes to block 620 which illustrates a determination of whether or not the command is an indication that network transmissions from MAC 232 should be disabled. If a determination is made that the command is an indication that MAC 232 network transmissions should be disabled, the process passes to block 622 which depicts the disabling of network transmissions from MAC 232. Disabling network transmissions of MAC 232 will temporarily isolate MAC 232 from PCI bus 208. Isolation refers to preventing MAC 232 from accepting packets from PCI bus 208 of sending packets to PCI bus 208. Those skilled in the art will appreciate that one of many different mechanisms may be utilized to isolate MAC 232 from PCI bus 208.

Therefore, network traffic will be received by MAC 232 but will not be placed on PCI bus 208. The operating system will not receive any network packets. Also, any network traffic that client computer system 104 attempts to generate will not be able to reach MAC 232. Thus, network traffic will not be forwarded by MAC 232 to the rest of client 104, and will not be generated by MAC 232 or transmitted to the network. Client computer system 104 will not be able to generate any network traffic. The process then passes to block 602.

Referring again to block 620, if a determination is made that the command is not an indication that network transmissions from MAC 232 should be disabled, the process passes to block 624 which depicts a determination of whether or not the command is an indication that the network transmissions of MAC 232 should be enabled or re-enabled. Because MAC 232 is still receiving packets when it is isolated from PCI bus 208, MAC 232 will be able to receive an indication, included within a network packet, from server computer system 100 that MAC 232 should be re-enabled. If a determination is made that MAC transmissions are to be re-enabled, the process passes to block 626 which illustrates the re-enablement of MAC transmissions. MAC transmissions are re-enabled by re-enabling the communication between the operating system and MAC 232 utilizing PCI bus 208. The process then passes back to block 602.

Referring again to block 624, if a determination is made that the command is not an indication that network transmissions from MAC 232 should be re-enabled, the process passes to block 628 which depicts a determination of whether or not the command is an indication that MAC 232 should be initialized. When MAC 232 is initialized, it is reset to a known operating condition. If a determination is made that the command is an indication that MAC 232 should be initialized, the process passes to block 630 which illustrates the initialization of MAC 232. MAC 232 may be initialized by a device driver resetting and initializing a session. The process then passes back to block 602.

The present invention provides a server computer system with the ability to remotely disable/re-enable the ability of the client computer system to access the network. Unless the ability has been permanently disabled, the client remains active and remains able to accept commands from the server. In this manner, the server has control of network access by the client.

The present invention recognizes that certain network errors that produce disruptive activity must be terminated immediately without regard to the operation of the client. In these situations, the server may cause the ability of the client to access the network to be permanently disabled.

In both cases, temporary and permanent disablement, the server is able to modify the ability of the client to access the network without an intervention of the client's operation system or application software.

While a preferred embodiment has been particularly shown and described, it will be understood by those skilled in the art that various changes in form and detail may be made therein without departing from the spirit and scope of the present invention.

What is claimed is:

1. A method in a data processing system for permitting a server computer system to remotely disable an ability of a client computer system to access a network which couples said client computer system to said server computer system, wherein said client computer system includes a processor executing an operating system, a media access controller for controlling access to said server computer system and an internal bus interconnecting said processor and said media access controller, said method comprising the steps of:

said server computer system transmitting an indication to said client computer system utilizing said network that said ability of said client computer system to access said network be at least temporarily disabled; and in response to a receipt of said indication by said client computer system, at least temporarily disabling said ability of said client computer system to access said network by isolating said media access controller from said internal bus, said client computer system being unable to transmit information utilizing said network while said client computer system is temporarily disabled.

2. The method according to claim 1, further comprising the steps of:

said server computer system transmitting an indication to said client computer system utilizing said network that said ability of said client computer system to access said network be re-enabled; and in response to a receipt of said indication by said client computer system, re-enabling said ability of said client computer system to access said network by reconnecting said media access controller to said internal bus, said client computer system being able to transmit information utilizing said network while said client computer system is re-enabled.

3. The method according to claim 1, further comprising the steps of:

said server computer system transmitting an indication to said client computer system utilizing said network that said ability of said client computer system to access said network be initialized; and in response to a receipt of said indication by said client computer system, initializing said ability of said client computer system to access said network.

4. The method according to claim 3, wherein said step of initializing said ability of said client computer system to access said network further comprises the step of initializing said media access controller included within said client computer system to access said network.

5. The method according to claim 1, further comprising the steps of:

said server computer system transmitting an indication to said client computer system utilizing said network that said ability of said client computer system to access said network be permanently disabled; and in response to a receipt of said indication by said client computer system, permanently disabling said ability of said client computer system to access said network by generating a physical layer reset, said client computer system being unable to transmit information utilizing said network while said client computer system is disabled.

6. The method according to claim 5, further comprising the step of requiring a user to remove said physical layer reset prior to permitting a re-enabling said ability of said client computer system to access said network.

7. A data processing system including a server computer system and a client computer system coupled together utilizing a network, said client computer system comprising:

a network adapter including a network controller and a special purpose processing unit coupled to said network controller, said network controller coupled to a processor within said client computer system via an internal bus and capable of receiving and transmitting network packets utilizing said network to said server computer system;

said network controller for receiving a network packet from said server computer system, said network packet including a magic packet and one of a plurality of commands;

said network controller for transmitting said network packet to said special purpose processing unit in response to a receipt of said network packet;

said special purpose processing unit executing code for determining said network packet includes said magic packet; and in response to said special purpose processing unit determining said network packet includes said magic packet, said special purpose processing unit executing code for executing said one of said plurality of commands causing an ability of said network controller to access said network to be at least temporarily disabled by isolating said network adaptor from said internal bus.

* * * * *